US006986162B2

(12) United States Patent
Soto et al.

(10) Patent No.: US 6,986,162 B2
(45) Date of Patent: Jan. 17, 2006

(54) FACEMASK ASSEMBLY FOR NIGHT VISION GOGGLES

(75) Inventors: Ronald R. Soto, Laguna Hills, CA (US); David A. Robinson, Huntington Beach, CA (US); Jonathon R. Prendergast, Newport Beach, CA (US); John E. Soto, Laguna Hills, CA (US); Pascal A. Barth, Rancho Margarita, CA (US)

(73) Assignee: Norotos, Inc., Santa Ana, CA (US)

( * ) Notice: Subject to any disclaimer, the term of this patent is extended or adjusted under 35 U.S.C. 154(b) by 0 days.

(21) Appl. No.: 10/752,382

(22) Filed: Jan. 5, 2004

(65) Prior Publication Data

US 2004/0181858 A1 Sep. 23, 2004

Related U.S. Application Data

(60) Provisional application No. 60/438,027, filed on Jan. 3, 2003.

(51) Int. Cl.
*F41H 1/04* (2006.01)

(52) U.S. Cl. .............................. 2/6.3; 2/422

(58) Field of Classification Search .............. 2/6.2, 2/6.3, 173, 421, 422, 6.6, 6.7, 420, 9, 414, 2/415, 452; 128/207.11; 224/181, 930; 359/409, 815

See application file for complete search history.

(56) References Cited

U.S. PATENT DOCUMENTS

| | | | | | |
|---|---|---|---|---|---|
| 553,146 | A | * | 1/1896 | Aitchison | 359/409 |
| 1,356,708 | A | * | 10/1920 | Goodyear | 351/156 |
| 2,418,376 | A | * | 4/1947 | Turner | 2/9 |
| 2,603,785 | A | * | 7/1952 | Splaine | 2/445 |
| 3,673,609 | A | * | 7/1972 | De Simone | 2/414 |
| 3,843,970 | A | * | 10/1974 | Marietta et al. | 2/415 |
| 4,753,378 | A | * | 6/1988 | Kastendieck et al. | 224/181 |
| 4,766,610 | A | * | 8/1988 | Mattes | 2/414 |
| 4,916,759 | A | * | 4/1990 | Arai | 2/414 |
| 5,484,392 | A | * | 1/1996 | Sydor et al. | 602/5 |
| 5,911,308 | A | * | 6/1999 | Chafitz et al. | 2/9 |
| 6,065,159 | A | * | 5/2000 | Hirsh | 2/425 |
| 6,701,535 | B2 | * | 3/2004 | Dobbie et al. | 2/422 |

OTHER PUBLICATIONS

Photograph of Angenieux Headmount, one sheet.
Photograph of Pilkington Headmount, one sheet.
Photograph of ITL Headmount, one sheet.

* cited by examiner

*Primary Examiner*—Rodney M. Lindsey
(74) *Attorney, Agent, or Firm*—Christie, Parker & Hale, LLP

(57) ABSTRACT

A facemask assembly for night vision goggles comprises a frame assembly, a mount assembly for attachment of the night vision goggles, an adjustment strap assembly, and a neck pad assembly, wherein the frame assembly is generally C-shaped and contoured to extend across the upper forehead of a user, with each end of the generally C-shaped frame assembly extending down around the outside of the eyes and to the hollow of the cheeks of a user, below the cheek bones and above the jaw.

19 Claims, 9 Drawing Sheets

FACEMASK ASSEMBLY FOR NIGHT VISION GOGGLES

CROSS-REFERENCE TO RELATED APPLICATION

This application claims priority of provisional application Ser. No. 60/438,027 filed on Jan. 3, 2003.

BACKGROUND

Facemask assemblies for night vision goggles generally consist of a headband assembly, strap assembly, neck pad assembly, and mount assembly. The headband assembly serves as the frame or foundation for the rest of the facemask assembly. The strap assembly serves to fasten the headband assembly to varying users' head sizes and shapes. The mount assembly serves to provide a means of mounting the night vision goggles to the facemask assembly as well as providing the positioning adjustments for aligning the night vision goggles to the user's line-of-sight.

Typical positioning adjustments provided by the mount assembly include fore/aft, line-of-sight tilt, vertical, and interpupillary distance (IPD). Another function provided by the mount assembly may be flip-up/flip-down or swing-away of the goggle mount. These functions allow the night vision goggles to be removed from the user's line-of-sight to a stowed position. This is necessary when the user needs to use his or her unaided vision.

Previous facemask assemblies did not provide the comfort or stability necessary for various night vision goggle operations as provided in embodiments of the present invention. For example, when worn for extended periods of time, previous facemask assemblies became very painful to various areas of users' heads due to, for instance, the location and type of padding and the configuration of the frame. Likewise, these previous facemask assemblies do not hold the night vision goggles in position for the user to use them properly during physical operations such as running, jumping, crawling and rolling.

Also, previous facemask assemblies did not provide proper night vision goggle positioning adjustments allowing the user to properly position the goggles in front of his or her eyes to maximize the benefit of the night vision goggles' field-of-view and eye relief. Previous facemask assemblies further did not provide a fold-away function allowing the facemask assembly to be folded into a compact shape for storage. Moreover, previous facemask assemblies did not provide a quick-release mechanism allowing the user to quickly remove the facemask assembly from his or her head. Finally, previous facemask assemblies mandated the use of a chin cup.

SUMMARY OF THE INVENTION

In one embodiment, the present invention provides a facemask assembly for night vision goggles comprising a frame assembly, a mount assembly for attachment of the night vision goggles, an adjustment strap assembly, and a neck pad assembly, wherein the frame assembly is generally C-shaped and contoured to extend across the upper forehead of a user, with each end of the generally C-shaped frame assembly extending down around the outside of the eyes and to the hollow of the cheeks of a user, below the cheek bones and above the jaw.

In an alternative embodiment, the present invention provides a facemask assembly for night vision goggles comprising, a frame assembly; a mount assembly for attachment of the night vision goggles, an adjustment strap assembly and a neck pad assembly, wherein the frame assembly is hinged to allow rotation of at least one portion of the frame assembly with respect to the remainder of the frame assembly through a limited range of motion between an open configuration for use and a folded configuration for storage.

In yet another alternative embodiment, the present invention provides a facemask assembly for night vision goggles comprising, a frame assembly, a mount assembly for attachment of the night vision goggles, an adjustment strap assembly, a neck pad assembly, and a protective pad positioned on top of a user's head when the facemask assembly is being worn to protect the user's head from injury from the night vision goggles when in a stowed position.

BRIEF DESCRIPTION OF THE DRAWINGS

FIG. 4b is a side view of the opposite surface of the frame member of FIG. 4a.

DETAILED DESCRIPTION

The facemask assembly 10 of one embodiment of the present invention is designed for maximum comfort and stability. This has been accomplished through the shape and padding of the facemask frame, as well as the neck pad and strap adjustments. The design also provides sufficient stability of night vision goggles during quick movement operations and allows the user to align the optical axis of the night vision goggles to his or her line-of-sight for optimal viewing.

Figure 1:
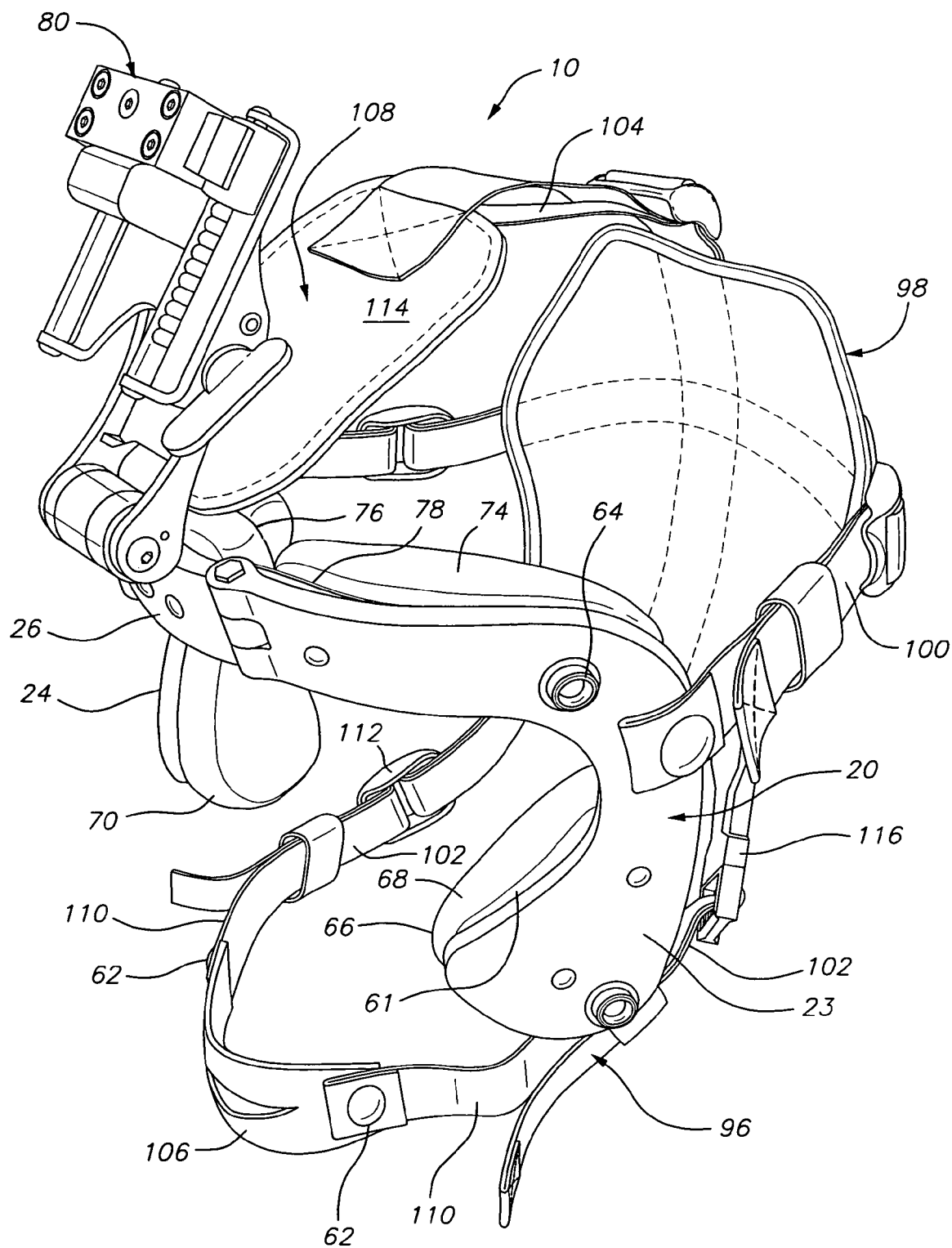
FIG. 1 is a perspective view of an embodiment of a facemask assembly of the present invention.

In one embodiment as shown in FIG. 1, the facemask assembly 10 may comprise a frame assembly 20, a mount assembly 80, an adjustment strap assembly 96 and a neck pad assembly 98. The frame assembly 20 serves as the foundation for the other remaining components of the facemask assembly 10. The frame assembly 20 is designed to properly fit the differing anthropometric shapes of the $5^{th}$ to $95^{th}$ percentile human head. Further, the curvatures of the frame assembly 20 fit the human face in a manner which minimizes discomfort by avoiding sensitive areas of the face and by spreading the load area over sufficient surface area.

Figure 2:
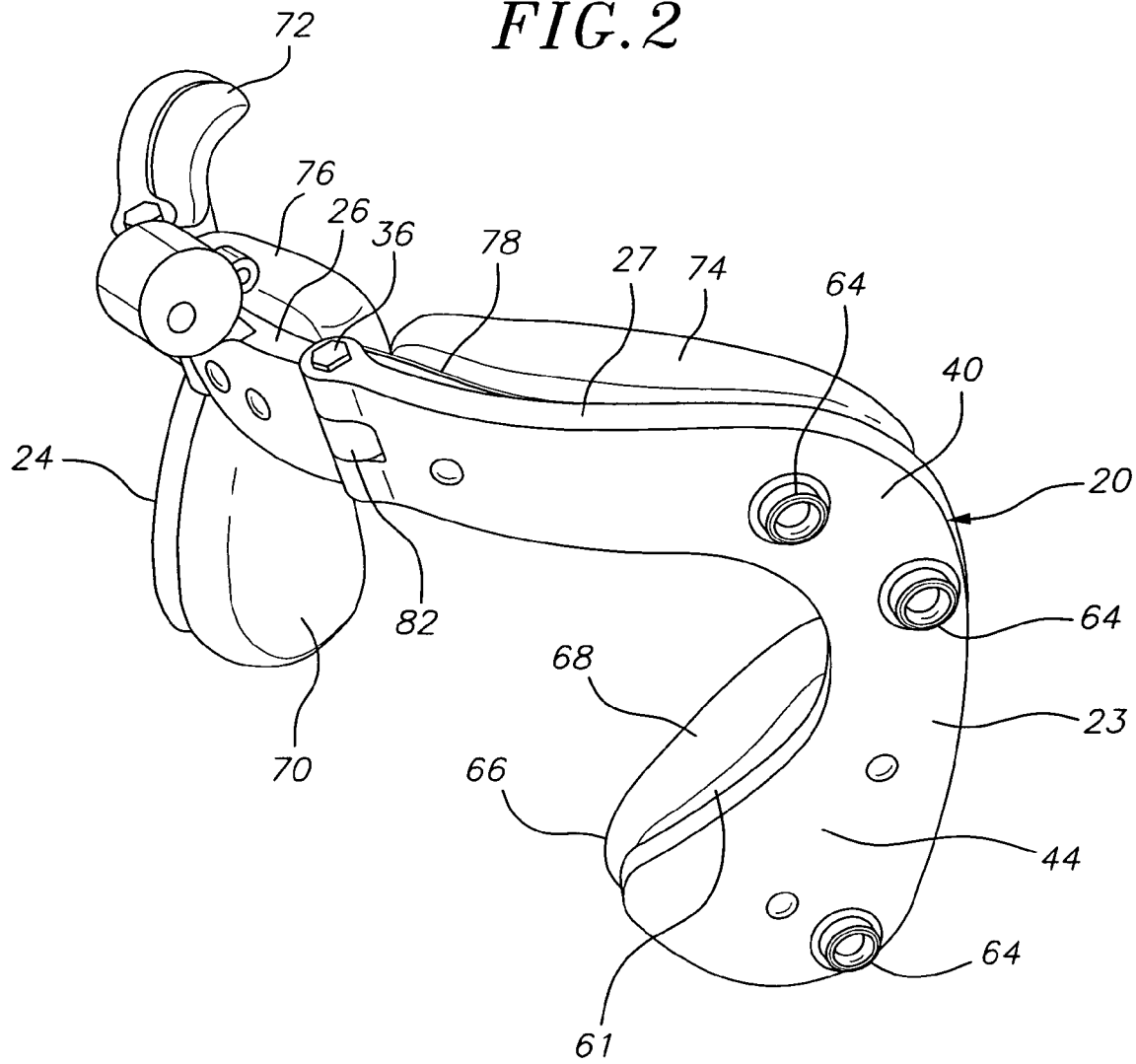
FIG. 2 is a perspective view of a frame assembly of the facemask assembly of FIG. 1.

In one embodiment, the facemask assembly 10 includes a frame assembly 20 as shown in FIG. 2. The frame assembly 20 may comprise a first frame member 23, a second frame member 24 and a bridge 26 between the first and second frame members. The second frame member 24 is a mirror image of the first frame member 23. Therefore, for clarity, only the first frame member 23 will be discussed in detail.

Figure 3:
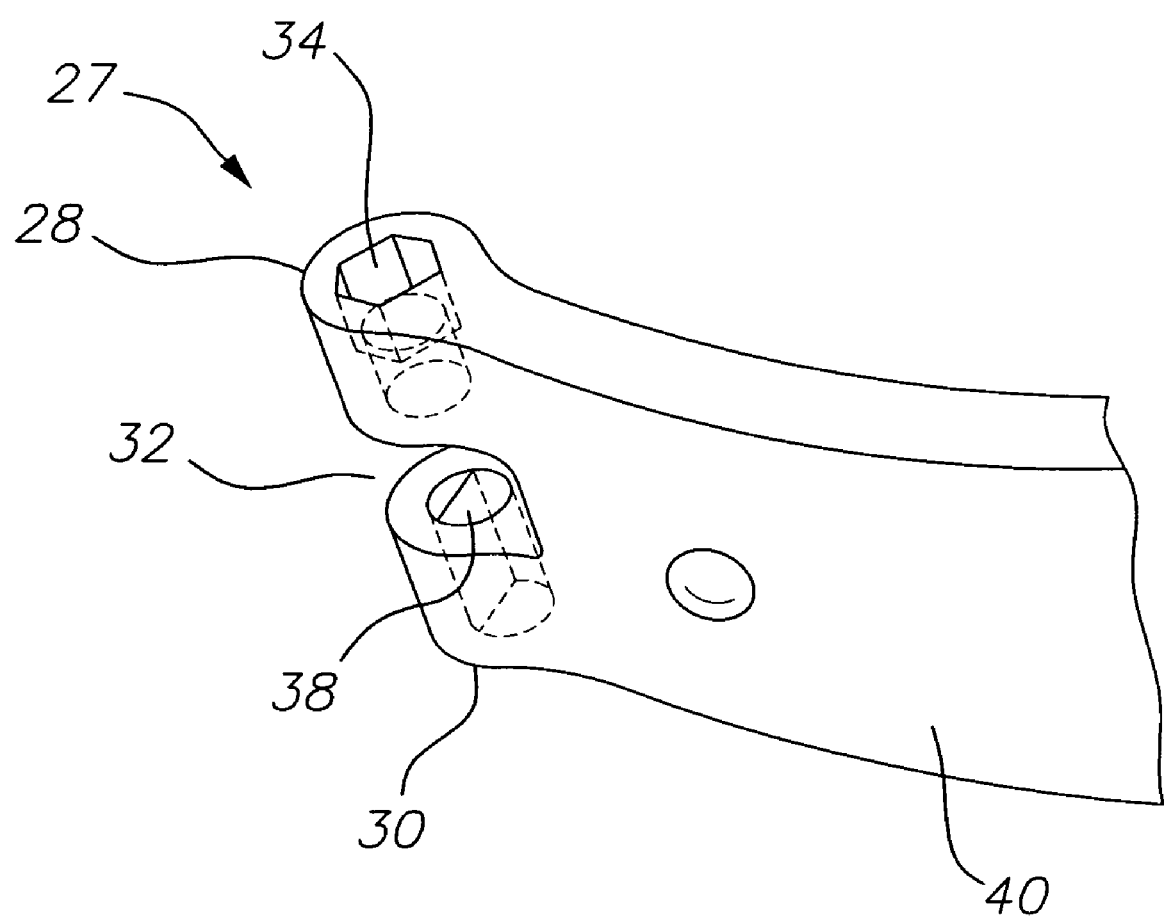
FIG. 3 is a perspective view of a hinge end of a frame member of the present invention.

The first frame member 23 may comprise a body 40, a hinge end 27, and a cheek end 44. As shown in FIG. 3, the hinge end 27 on the first frame member 23 includes an upper cylinder 28 and a lower cylinder 30 separated by a recess 32 adapted to receive an arm 82 from the bridge 26 (discussed in more detail below). The upper cylinder 28 may have an opening 34 running through the length of the cylinder adapted to allow a hinge pin 36 to be passed therethrough. For instance, the opening 34 may be hexagonal in cross section at an upper end and circular in cross section at a lower end in order to receive and be consistent with the shape of a head and upper shaft of the hinge pin 36. The hexagonal cross section upper end and hexagonal head act to hold the hinge pin in place and to prevent rotation of the hinge pin relative to the frame member. Similarly, the lower cylinder 30 may also have an opening 38 adapted to allow a lower shaft of the hinge pin to be passed therethrough. The opening 38 may have a flat or a non-circular cross section however, to provide a stop on which the inserted hinge pin 36 may rest to assist in preventing it from rotating relative to the frame member.

Extending from the hinge end 27 of the first frame member 23 is the body 40. The body 40 of the first frame member 23 is designed to generally follow the contour of a human face from the upper forehead above the eyebrows, around the eyes and to the hollow of the cheek below the cheek bones and above the jaw. One example of a shape of the body 40 is shown in two dimensions in FIG. 4a and in three dimensions is described by data provided in Appendix A corresponding to the points shown in FIG. 4b. The data are points in a Cartesian coordinate system and, when entered into an appropriate software application, such as ProE, or CAD, the resulting points cloud will provide an exemplary three-dimensional shape of the body 40 of the first frame member 23.

In one embodiment, the body 40 is substantially C-shaped and tapers outward to form the cheek end 44. Although the exact width of the body 40 is not critical, the body should be wide enough to provide enough surface area so that correspondingly-sized padding (to be discussed in more detail below) attached to the body provides comfort to a user wearing the facemask assembly 10 for long periods of time. However, the body 40 should not be so wide as to make the facemask assembly 10 unduly heavy, bulky and difficult to store. In one particular embodiment, the body 40 has a minimum width of about 1 inch near the hinge end and a maximum width of about 2 inches near the cheek end.

The first frame member 23 may be manufactured from a durable, yet lightweight and flexible material. Durability is desired for stability in operation of the mount assembly and to withstand wear and tear during long term use. Light weight and flexibility are desired for comfort to the wearer during long term use. More specifically, the first frame member 23 may be manufactured from a plastic or polymer material, such as a polyamide resin system, and even more specifically, the first frame member may be manufactured from nylon 6/6.

Figure 4A:
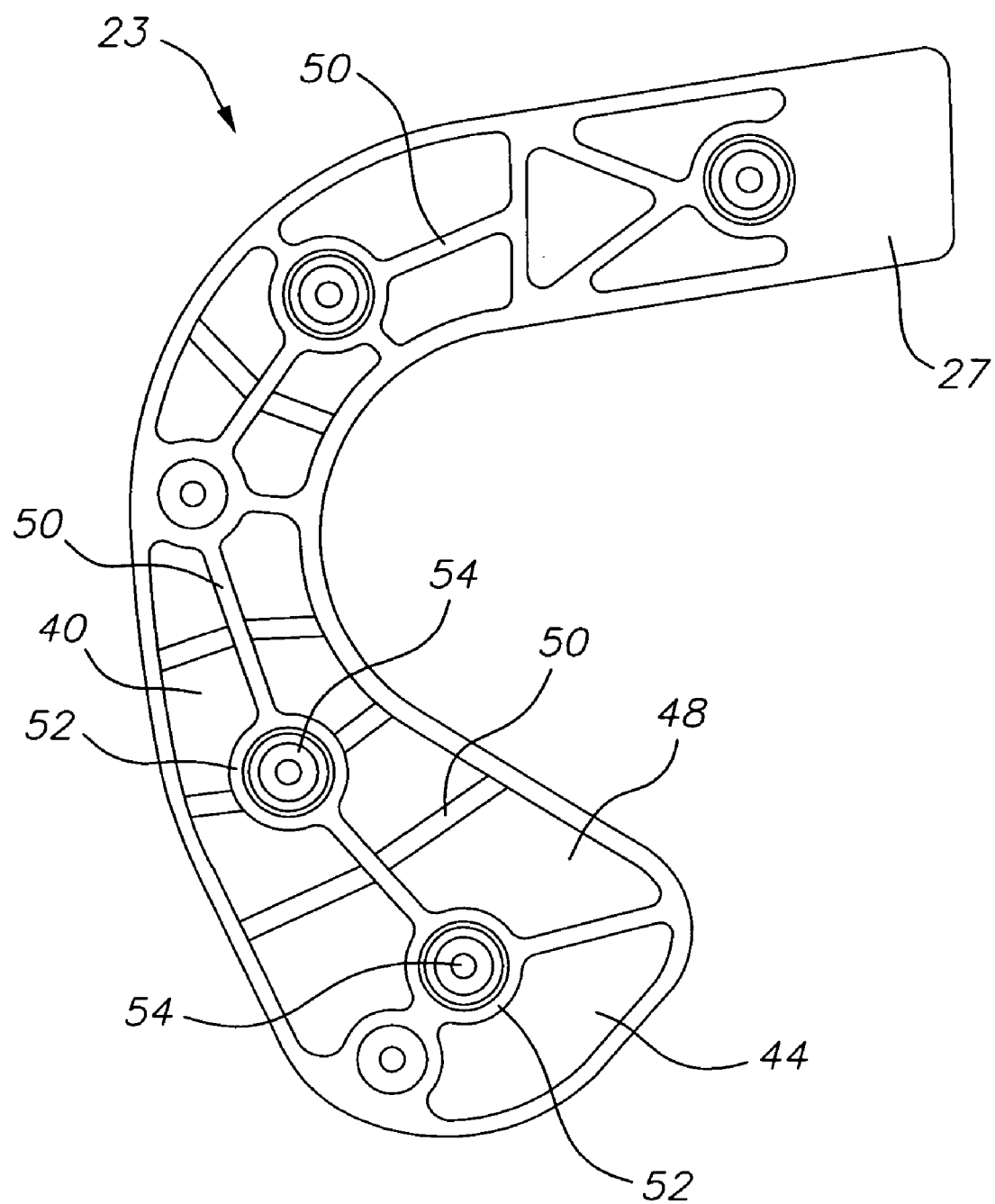
FIG. 4a is a side view of one surface of a frame member of the present invention.
Figure 4B:
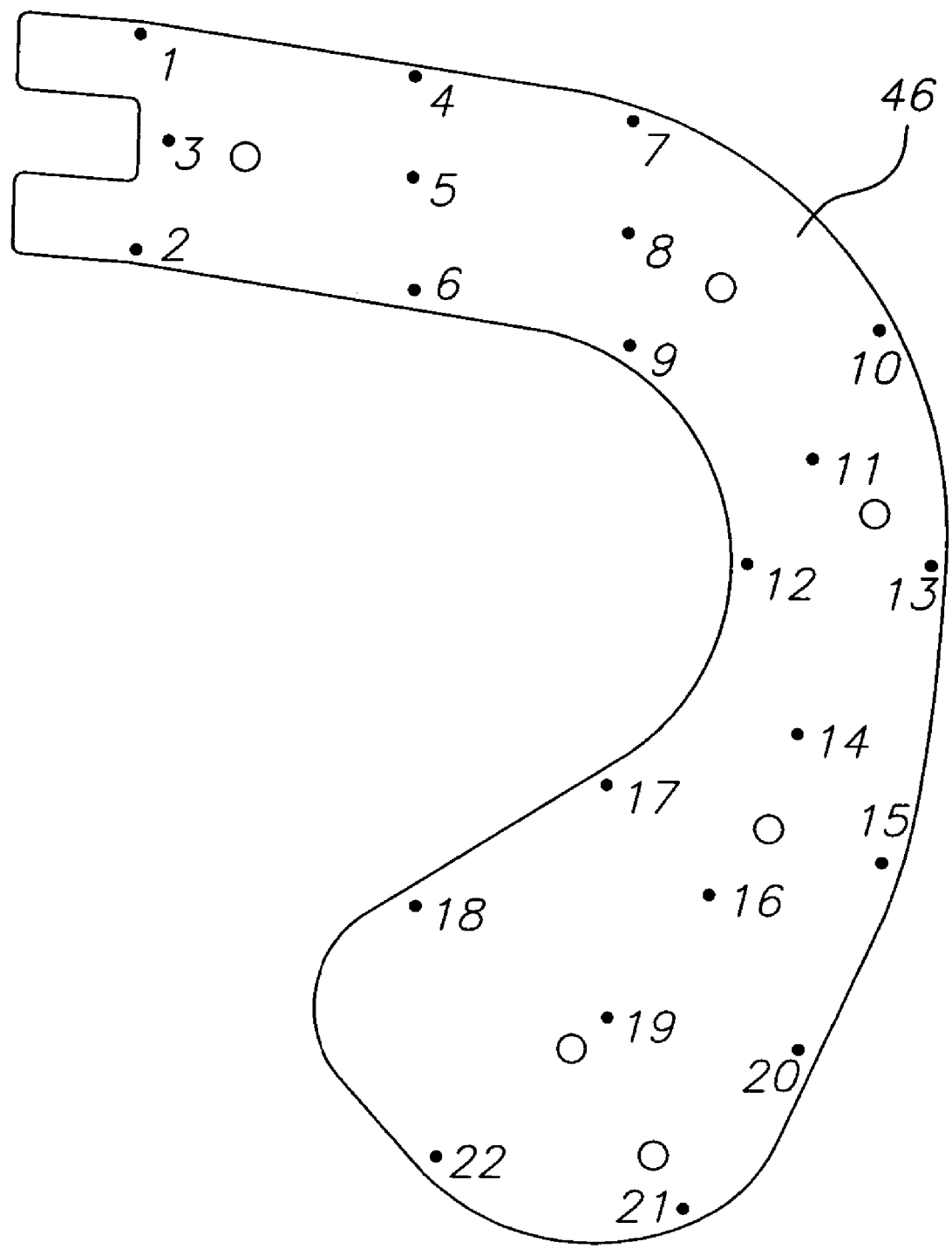

The first frame member 23 has an exterior surface 46 (see FIG. 4b) and an interior surface 48 (see FIG. 4a). In one embodiment, the exterior surface 46 may be smooth and streamlined in order to enable it to avoid snag hazards. The interior surface 48 may include ribs 50. The ribs 50 serve to add rigidity to the frame member 23. A greater number and denser concentration of ribs 50, as well as thicker ribs, may be used to provide the frame member 23 with greater rigidity. Greater rigidity is desirable at the hinge end of the frame members to provide stability for operation of the mount assembly. Whereas, greater flexibility is desirable at the cheek end of the frame members to allow for adjustment to conform comfortably to a wearer's face. The interior surface 48 may also include circular protrusions 52 which serve as a base for snap attachment members 54. Snap attachment members 54 are adapted to receive snaps 64 (discussed in more detail later) and may be attached to either or both the exterior and interior surfaces 46, 48 of the frame members 23, 24.

Figure 5:
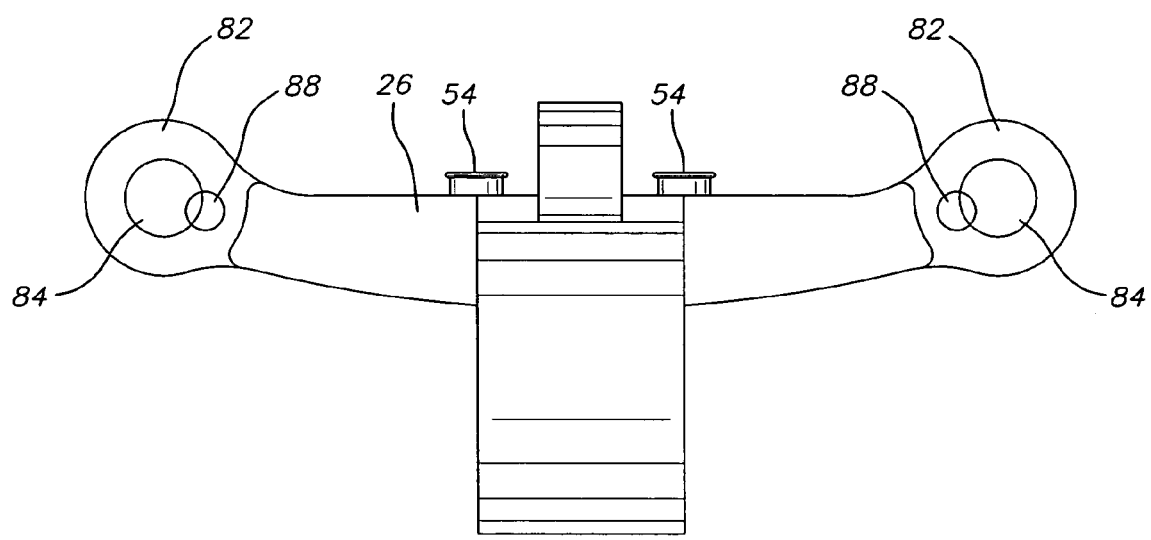
FIG. 5 is a top view of a bridge of the frame assembly of FIG. 2.
Figure 6:
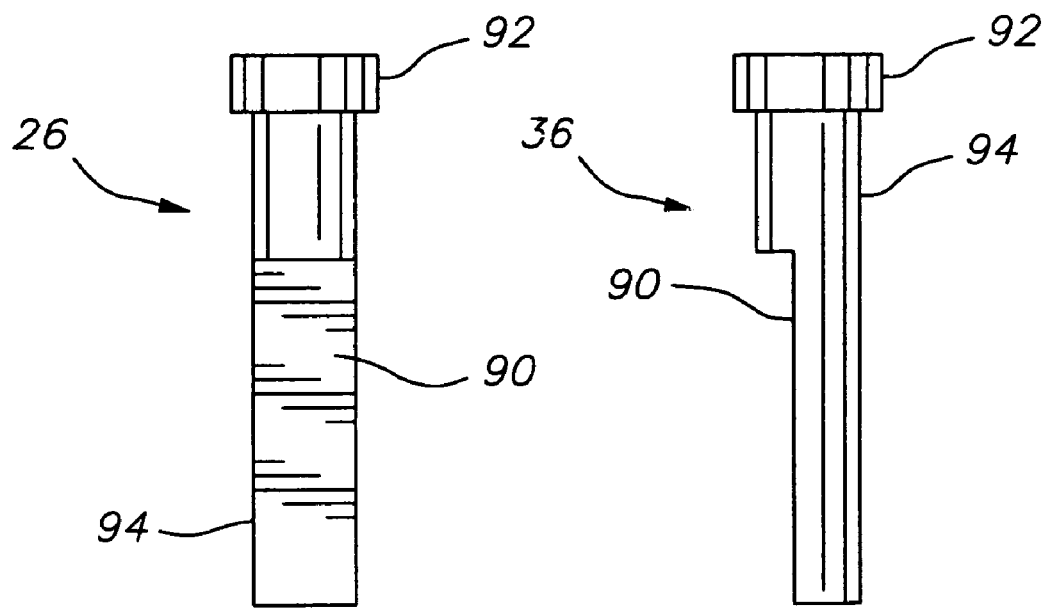
FIG. 6a is a front view of a hinge pin of the frame assembly of FIG. 2
FIG. 6b is a side view of a hinge pin of the frame assembly of FIG. 2
Figure 7:
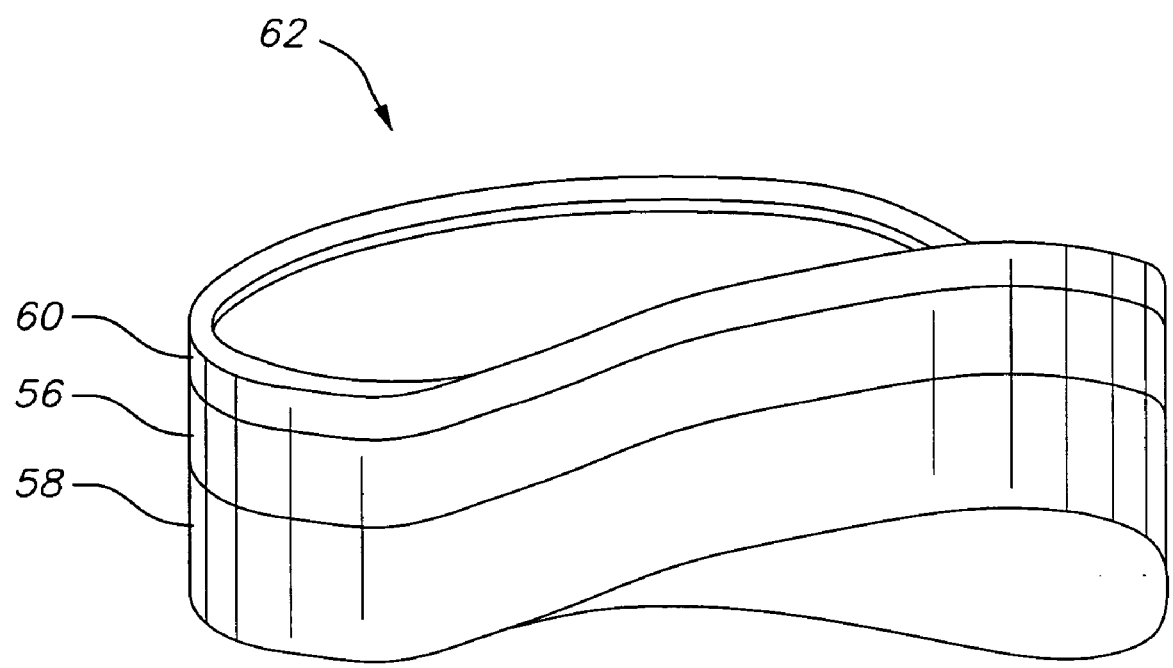
FIG. 7 is a perspective view of an interior of a pad of the present invention.

The bridge 26 serves to connect the first frame member 23 to the second frame member 24 and also serves as a base for the mount assembly 80. The bridge may be substantially rectangular and has two arms 82 extending laterally from each side. The arms 82 are adapted to fit into the recess 32 of the first and second frame members 23, 24. A circular cross section opening 84 runs through the center of each arm 82. When the arms 82 are inserted into the recess 32 of the frame members 23, 24, the opening 84 in the arm may be aligned with the openings 34 and 38 in the upper and lower cylinders 28, 30 of the frame members 23, 24 to allow the hinge pin 36 to be inserted therethrough. Additionally, the opening 84 in the arm 82 may include a stop pin 88 or other stop feature (see FIG. 5). In one embodiment, the stop pin 88 comprises a cylindrical dowel, preferably made of metal, coaxial to the opening 84, wherein the stop pin 88 partially protrudes into the otherwise circular cross section opening.

The frame assembly could be formed in a single piece in an open configuration adapted to fit on a wearer's face. However, to allow the frame assembly to be folded into a more compact configuration for storage, the frame assembly may be comprised, as shown in the drawings, of multiple pieces that are hinged for rotation relative to one another.

A foldable frame assembly may further comprise two hinge pins 36. The hinge pins 36, in a particular embodiment, may include a hexagonal head 92 and a generally cylindrical shaft or body 94. The body 94 may further include a flat 90. The exact shape of the hinge pin 36 in this particular foldable embodiment is not critical, but rather the pin should be shaped such that it corresponds to the shape of the openings 34, 38, 84 and also so that it does not rotate relative to the frame members but does allow the frame member to rotate through at least some range of motion relative to the bridge.

In a foldable embodiment of the present invention, the frame members 23, 24 are rotatable. When the hinge pin 36 is inserted through the openings 34, 38, 84, the stop pin 88 in the bridge opening 84 acts to restrict the rotatability of the hinge pin 36 to a particular range of motion. More specifically, when the frame members 23, 24 are rotated, the flat 90 of the hinge pin 36 pivots relative to the stop pin 88 in a limited range of motion rather than being able to rotate freely for 360 degrees. At one end of that range of motion, the frame members are positioned relative to the bridge to be at the optimal open configuration for use by a wearer. At the other end of that range of motion, the frame members are positioned relative to the bridge to be at the optimal closed configuration for storage.

Additionally, the bridge 26 may include two snap attachment members 54 which allow the attachment of a brow pad (discussed in more detail below). In one embodiment, the bridge 26 is made from aluminum. However, the bridge 26 may be made from any lightweight, durable and rigid material.

The bridge 26 may also be adapted to serve as the base for a mount assembly 80. In one embodiment, the mount assembly 80, to which night vision goggles (not shown) are attached, may have three positions. A first, or use, position allows a user to see out of night vision goggles attached to the mount assembly 80. A second, stowed or flipped-up, position allows the user to move the mount assembly 80 above their head so that the goggles do not interfere with the user when they are not needed. A third, or storage, position allows a user to fold the mount assembly 80 back over the first and second frame members 23, 24 to form the most compact orientation of the facemask assembly 10 for storage.

Padding may be attached to the interior surface of the frame members 23, 24 to provide comfort for the facemask assembly user. In one embodiment, a pad 62 may include an outer protective sheath and two layers of foam to provide for maximum comfort. A first layer 56 of foam, away from the user's face, may be a polyurethane foam and may have a thickness of about 0.25 inch, a density of about 15 lbs/cu. ft and a compression of about 1 to 5 psi. Specifically, the first layer 56 of foam may be Poron. A second layer 58 of foam, closest to the user's face, may also be a polyurethane foam and may have a thickness of about 0.5 inch, a density of about 2 lbs/cu. ft and a compression of about 0.7 psi. Specifically, the second layer 58 of foam may be Unifoam. The first and second layers of foam 56, 58 may be attached together by an adhesive or by any other appropriate means of securing them together. The second layer of foam is designed to form itself around the facial features with minimal pressure applied. The first layer of foam allows for additional cushioning as needed where increased pressure is created by tightening the facemask to the face in order to hold it securely during operation.

In an alternate embodiment, the second foam layer 58 is replaced by an air bladder (not shown). The air bladder may have similar thickness, density and compression qualities as the second layer of foam 58.

Adjacent to the first layer 56 of foam may be a first molded backplate 60 which serves as a base for the foam layers 56, 58 and as a means to which the outer protective sheath or a covering 66 may be attached. The first molded backplate 60 may be molded to follow the contour of the part of the frame member 23, 24 to which it will be attached. The first molded backplate 60 may be manufactured from nylon 6/6 or any other appropriate lightweight and durable material.

The covering 66 may surround the two layers of foam 56, 58 and the first molded backplate 60. Preferably, the covering 66 is durable yet comfortable when it is in contact with human skin for extended periods of time. In one embodiment, the covering 66 is sheepskin leather and may be attached to the first molded backplate 60 by an adhesive or any other appropriate means of attachment.

A second molded backplate 61 serves to hold means to attach the pad 62 to the facemask assembly 10 and to shape the surface of the pad 62 adjacent to the facemask assembly. The second backplate 61 may be attached to the covering 66 and/or the first molded backplate by an adhesive or any other appropriate means of attachment. Further, the second molded backplate 61 may be manufactured from the same material as the first molded backplate 60.

The pads may be fixedly attached to the facemask. In one alternative embodiment, the pads 62 may removably attached to the facemask assembly 10 by snaps 54/64. The snap system provides a robust means of retaining the pads 62 to the frame assembly 20 as well as an easy method for removing the pads to allow for easier cleaning of dirty pads or replacing worn pads At least one snap 54/64 is attached to a pad 62, and in one embodiment, two snaps 54/64 are attached to each pad. Having two snaps 54/64 provides added security against a pad 62 inadvertently detaching from the facemask assembly 10. Alternately, the pads 62 may attach to the facemask by VELCRO® or by any other attachment means that securely attach the pads to the facemask assembly, yet allow the pads to be easily and quickly removed and reattached.

The number of pads 62 on the facemask assembly 10 is not critical. However, there should be enough pad surface area to make the facemask assembly 10 comfortable to wear for extended periods of time by distributing pressure over a wider surface, but not so much pad surface area so as to make the facemask assembly 10 too bulky for compact storage.

One embodiment of the present invention includes five pads: first and second cheek pads 68, 70 and first, second and third brow pads 72, 74, 76. The first and second cheek pads 68, 70 attach to the cheek end 44 of the first and second frame members 23, 24 respectively and are positioned to rest in the hollow of the user's cheek below the cheek bone and above the jaw bone when the facemask assembly 10 is worn. The first and second brow pads 72, 74 attach to the body of the first and second frame members 23, 24 respectively, adjacent the hinge end 27. The third brow pad 76 attaches to the bridge 26. The brow pads are positioned to rest on a user's forehead above the sinus cavities, eyebrows and other sensitive areas near a user's eyes. In a particular embodiment, the first, second and third brow pads 72, 74, 76 may be connected together by a ribbon 78 which is placed between the first and second molded backplates 60, 61 and may be secured there by an adhesive. The ribbon 78 serves to keep the brow pads 72, 74, 76 together as one unit, making them more difficult to misplace.

In one embodiment of the present invention, the frame assembly 20 is transformable between a storage position and a use position. In the storage position, the frame assembly 20 may be folded down to a compact shape for storage in a carrying case (not shown). If the frame assembly 20 could not be formed into a compact storage position, the facemask assembly 20 would be difficult to store in a small compartment and would be more susceptible to damage during storage. The ability to fold the facemask assembly 20 into a compact shape helps to minimize the bulk of equipment the user must carry as well as to protect it while it is in storage.

In the storage position, the frame members 23, 24 are positioned such that the first cheek and brow pads 68, 72 are adjacent the second cheek and brow pads 70, 74, i.e., the angle formed by the bridge 26 and each frame member 23, 24 is about 90 degrees or less. In a particular embodiment, pads 68 and 72 will touch pads 70 and 74, respectively, in the storage position. The stop pin may restrict further motion so that the pads will not be damaged during storage by being crushed into one another or other parts of the facemask. On the other hand, in the use position, the frame members 23, 24 are rotated such that when worn by a user, the brow pads 72, 74, 76 will line the user's upper forehead and the cheek pads 68, 70 will rest in the hollows of the user's cheeks. In the use position, the angle between the bridge 26 and each frame member 23, 24 is about 145 degrees or more. In one particular embodiment, the angle between the bridge 26 and each frame member 23, 24 is about 180 degrees.

The shape of the frame assembly 20 is designed to accommodate most eyewear, including protective eyewear. The frame assembly 20 does not incorporate padding between the browpads and cheek pads, allowing the arms or straps of eyewear to pass between the frame members 23, 24 and the user's face. Since many users of night vision equipment use protective or corrective eyewear during operations, this enables most users to wear their eyewear in conjunction with the facemask assembly 10.

The mount assembly 80 provides the functions of night vision goggles mounting, fore/aft adjustment, line-of-sight tilt adjustment, and flip-up/flip-down. It also incorporates a magnet module participating in the function which turns the night vision goggles off if the night vision goggles is removed from the mount assembly or flipped-up to the stowed position. These mechanisms are described in greater detail in U.S. Pat. No. 5,914,816 to Soto, et al., which is incorporated by reference herein.

The neck pad assembly 98 is also designed for comfort and stability. The neck pad assembly 98 serves as an anchor point for the facemask assembly 10 once the assembly is put on. Specifically, in one embodiment, all of the straps of the adjustment strap assembly 96 (described in more detail below) may connect into the neckpad assembly 98. The neck pad assembly 98 grips the lower rear portion of the user's head providing stability to the frame assembly 10 and night vision goggles (not shown) during operations such as running, jumping and crawling. The particular shape of the neckpad assembly 98 is not critical. However, the neckpad assembly 98 should be of such a shape as to provide a stable anchor for the facemask assembly 10 as well as a comfortable support for the user. The materials used in the neck pad assembly 98 should provide strength and breathability to maximize ruggedness and comfort to the user during periods of extended operation. The neckpad assembly 98 may be manufactured from any flexible, yet durable material, for instance, nylon.

The adjustment strap assembly 96 as shown in FIG. 1 may comprise two upper side straps 100, two lower side straps 102, an upper center strap 104, a chin cup 106, and a protective pad 108. All adjustment straps may be tightened by pulling the end of the adjusting strap towards the front of the head. At least one of the lower side straps 102 incorporates a quick-release buckle 116 enabling the user to quickly remove the facemask assembly 10 if necessary. This also enables the user to quickly don the facemask assembly 10 if the adjustment straps have been previously fit to his or her head.

The chin cup 106 is an open design adapted to generally conform to the shape of a human chin. The chin cup 106 may further include straps 110 extending from either side. The straps 110 may be removably attached to the chin cup 106 by snaps 62 or by any other appropriate attachment means. This design positions the user's chin in the chin cup 106 between the two straps and securely holds the chin cup 106 in position during operation. The chin cup 106 is designed so that it cannot be assembled backwards or upside-down. Further, the shape of the chin cup 106 is symmetric both vertically and horizontally. The chin cup 106 may be manufactured from any durable but flexible material. For instance, the chin cup 106 may be made from nylon and may also incorporate sheepskin leather next to the user's skin for additional comfort.

Each adjustment strap may further incorporate a plastic self-locking buckle or ladder lock 112, as commonly found on, for instance, straps on a backpack. The buckles 112 may preferably be easy to use and have a low profile shape. Each buckle 112 allows the adjustment strap to easily be pulled for tightening and then holds the strap in position until the user pulls out on the buckle. The low profile shape of the buckles 112 helps prevent the inadvertent release of the straps by external items such as underbrush and cables.

The protective pad 108 serves to protect the user's head from injury if the mount assembly 80 rotates past the stowed position and comes in contact with the top of the user's head while the user is wearing the facemask assembly 10. The mount assembly 80 is designed to rotate past the stowed position to a storage position which configures the facemask assembly 10 for compact storage. However, the user may suffer an injury if the mount assembly 80 was able to strike the top of the head during maneuvers. The protective pad 108 incorporates a hard plastic shield 114 which distributes any force over a broad area and drastically reduces the possibility of a point impact to the user's head. The protective pad 108 may be made from a flexible durable exterior surface for ruggedness, a soft interior layer and a comfortable covering next to the user's head. For instance, the exterior may be nylon 6/6, the interior may be foam and the covering may be sheepskin leather.

Figure 8:
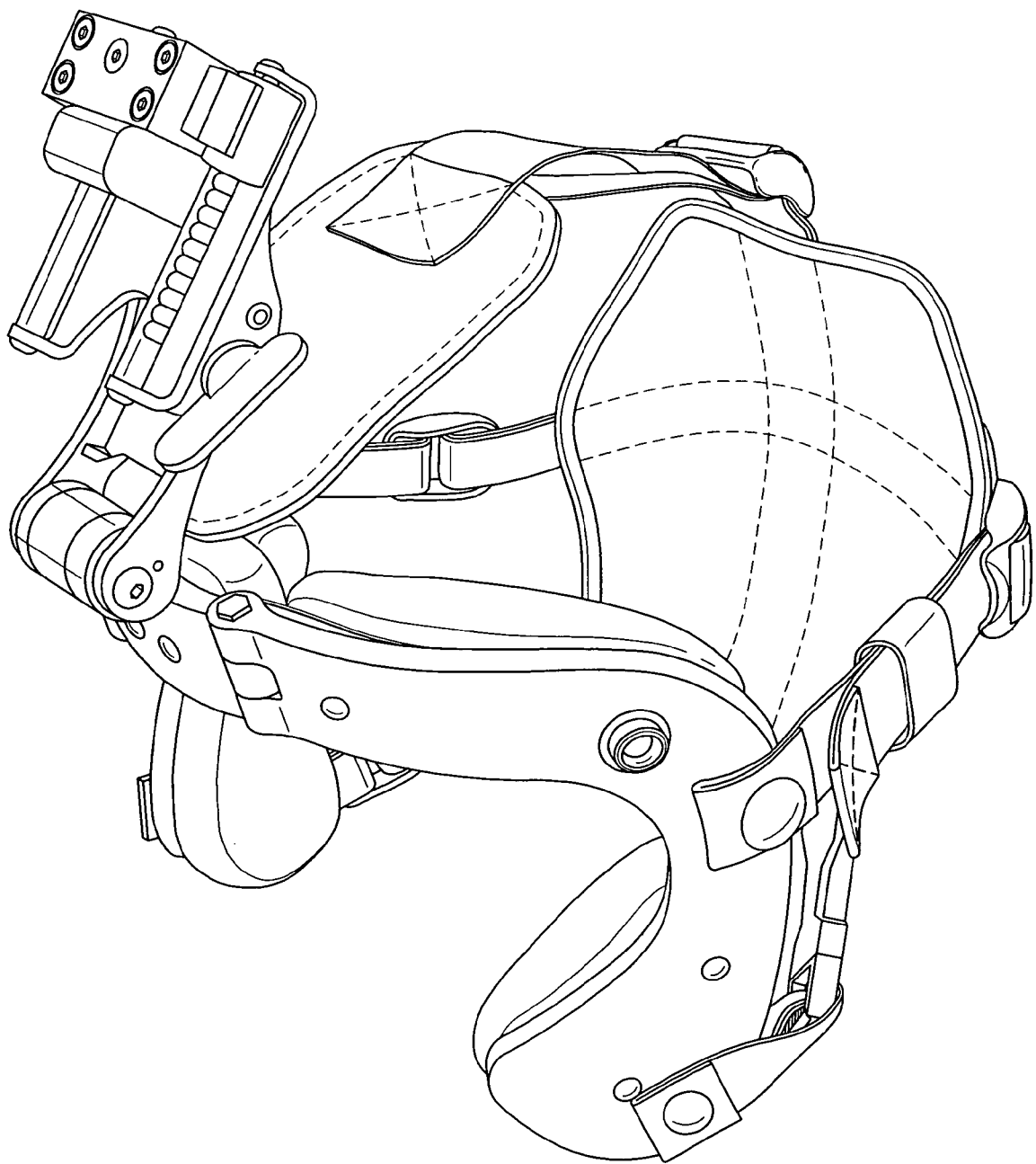
FIG. 8 is a perspective view of an alternate configuration of an adjustment strap assembly of the present invention.

The adjustable strap assembly 96 can be configured into at least two different configurations according to the user's preference. A first configuration, as shown in FIG. 1, includes the chin cup 106 and a second configuration, as shown in FIG. 8, does not include the chin cup. These alternate configurations give the user the opportunity to choose his or her preferred configuration. Typical users' preferences vary depending on the user's facial profile, their personal history with night vision goggles equipment, and their operational missions' requirements.

In the first configuration, the upper side straps 100 are attached to middle snap locations on the frame assembly 20 and the lower side straps 102 are attached to the chin cup 106. This leaves the upper snap locations and the lower snap locations on the frame assembly 20 unused.

In the second configuration, the upper side straps 100 are attached to the upper or middle snap locations on the frame assembly 20 and the lower side straps 102 are attached to the lower snap locations on the frame assembly 20. This leaves potentially the middle snap locations on the frame assembly 20 and the chin cup 106 unused.

The straps may be made of any strong, durable and flexible material. By way of example, the straps may be made of a woven nylon mesh material.

The adjustment straps are easy to use and incorporate a quick-release buckle for rapid removal. The strap assembly also offers the user multiple mounting configurations making the use of a chin cup optional. The night vision goggles positioning provided by the mount assembly allows the user to properly position the night vision goggles in front of their eyes. The flip-up/flip-down mechanism provides the ability of moving the night vision goggles into a stowed position when the night vision goggles needs to be removed from the user's line-of-sight.

While the foregoing describes the preferred embodiments of the invention, various alternatives, modifications and equivalents may be used. For instance, the number of pads used in the frame assembly 20 may be varied. Moreover, it will obvious that certain other modifications may be practiced within the scope of the appended claims.

What is claimed is:

1. A facemask assembly for night vision goggles comprising,
   a frame assembly;
   a mount assembly for attachment of the night vision goggles;
   an adjustment strap assembly; and
   a neck pad assembly,
   wherein the frame assembly is generally C-shaped and contoured to extend across the upper forehead of a user, with each end of the generally C-shaped frame assembly extending down around the outside of the eyes and to the hollow of the cheeks of a user, below the cheek bones and above the jaw, the frame assembly resting only on a user's upper forehead and in the hollows of a user's cheeks below the cheekbones and above the jaw bone.

2. A facemask assembly according to claim 1 also comprising at least one forehead pad attached to the frame assembly and positioned to be between the frame assembly and the upper forehead of a user when the facemask assembly is being worn by the user.

3. A facemask assembly according to claim 2 also comprising a pair of cheek pads, a first cheek pad attached to one end of the frame assembly and positioned to be between the frame assembly and the hollow of the cheek of a user when the facemask assembly is being worn by the user and a second cheek pad attached to the other end of the frame assembly and positioned to be between the frame assembly and the hollow of the other cheek of the user when the facemask assembly is being worn by the user.

4. A facemask assembly according to claim 3 wherein the pads are removably attached to the frame assembly.

5. A facemask assembly according to claim 4 wherein the pads are removably attached using at least one snap for each pad.

6. A facemask assembly according to claim 4 wherein the pads are removably attached using at least two snaps for each pad.

7. A facemask assembly according to claim 1 wherein the frame assembly has an exterior surface that is smooth and streamlined.

8. A facemask assembly according to claim 3 wherein the pads are covered with a protective sheath.

9. A facemask assembly according to claim 8 wherein the protective sheath is made of sheepskin leather.

10. A facemask assembly according to claim 3 wherein the pads are comprised of a foam material.

11. A facemask assembly according to claim 10 wherein a first portion of the foam material positioned closest to a user's face when the facemask is being worn is adapted to form itself around facial features while applying minimal pressure.

12. A facemask assembly according to claim 11 wherein the first portion is a polyurethane foam with a thickness of about 0.5 inch, having a density of about 2 lbs./cu. ft. and a compression of about 0.7 psi.

13. A facemask according to claim 11 wherein a second portion of the foam material positioned outside the first portion is adapted to allow for additional cushioning.

14. A facemask according to claim 13 wherein the second portion is a polyurethane foam with a thickness of about 0.25 inch, having a density of about 15 lbs/cu. ft. and a compression of about 1 to 5 psi.

15. A facemask assembly according to claim 3 wherein there is a gap between the at least one forehead pad and each of the cheek pads.

16. A facemask assembly according to claim 1 wherein the frame assembly is made from a durable, lightweight and flexible material.

17. A facemask assembly according to claim 1 wherein the frame assembly is made from nylon 6/6.

18. A facemask assembly according to claim 1 wherein the frame assembly is hinged so that the facemask assembly can be folded into a more compact configuration when not in use.

19. A facemask assembly for night vision goggles comprising,
   a frame assembly;
   a mount assembly for attachment of the night vision goggles;
   an adjustment strap assembly;
   a neck pad assembly; and
   a protective pad positioned on top of a user's head when the facemask assembly is being worn to protect the user's head from injury from the night vision goggles when in a stowed position, wherein the frame assembly is generally C-shaped and contoured to extend across the upper forehead of a user, with each end of the generally C-shaped frame assembly extending down around the outside of the eyes and to the hollow of the cheeks of a user, below the cheek bones and above the jaw, the frame assembly resting only on a user's upper forehead and in the hollows of a user's cheeks below the cheekbones and above the jaw bone; and
   wherein the frame assembly is hinged to allow rotation of at least one portion of the frame assembly with respect to the remainder of the frame assembly through a limited range of motion between an open configuration for use and a folded configuration for storage.

* * * * *